(12) United States Patent  
Nagasue

(10) Patent No.: US 6,853,240 B2  
(45) Date of Patent: Feb. 8, 2005

(54) MASTER CLOCK INPUT CIRCUIT

(75) Inventor: Makoto Nagasue, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 10/342,193

(22) Filed: Jan. 15, 2003

(65) Prior Publication Data

US 2003/0218491 A1 Nov. 27, 2003

(30) Foreign Application Priority Data

May 24, 2002 (JP) ........................................ 2002-151359

(51) Int. Cl.[7] ............................. H03B 5/30; H03L 7/00
(52) U.S. Cl. ................. 327/554; 327/291; 331/116 FE
(58) Field of Search ............................... 327/170, 291, 327/299, 306–307, 544; 331/116 FE, 158

(56) References Cited

U.S. PATENT DOCUMENTS

| | | | | |
|---|---|---|---|---|
| 5,905,682 A | * | 5/1999 | Gans et al. ................. | 365/201 |
| 6,150,862 A | * | 11/2000 | Vikinski ..................... | 327/262 |
| 6,177,847 B1 | * | 1/2001 | Nagasue .................... | 331/158 |
| 6,326,823 B1 | | 12/2001 | Okui ........................... | 327/160 |
| 6,600,353 B2 | * | 7/2003 | Linam et al. ............... | 327/170 |

FOREIGN PATENT DOCUMENTS

| | | |
|---|---|---|
| JP | 64-080105 | 3/1989 |
| JP | 05-335913 | 12/1993 |
| JP | 06/120805 | 4/1994 |
| JP | 08-079042 | 3/1996 |
| JP | 2001-51744 | 2/2001 |

* cited by examiner

*Primary Examiner*—Dinh T. Le  
(74) *Attorney, Agent, or Firm*—Rabin & Berdo, P.C.

(57) ABSTRACT

A master clock input circuit with excellent amplification characteristics which generates little noise during mode switching. In a master clock input circuit, the output electric potential of an amplification gate circuit (for example, a NOR gate) is superimposed on a master clock and supplied to the input terminal of an amplification gate circuit. A transmission gate circuit and impedance control gate are provided between the output terminal and input terminal. The transmission gate circuit has low impedance and the impedance control circuit has high impedance. The transmission gate circuit opens and closes the line between the output terminal and input terminal of the amplification gate circuit. Since the impedance of the transmission gate circuit is low, generation of noise is reduced. In addition, since the impedance of the impedance control circuit is high, the amplification factor of the amplification gate circuit becomes higher.

22 Claims, 10 Drawing Sheets

(A) PD (B) INVERTED VALUE OF PD (C) POTENTIAL OF CLOCK INPUT TERMINAL

MASTER CLOCK INPUT CIRCUIT

BACKGROUND OF THE INVENTION

1. Field of the Invention

The present invention relates to a master clock input circuit for amplifying and outputting a master clock input from an oscillator, or the like, when a mode signal is at an active level.

2. Description of Related Art

A master clock input circuit is a circuit for amplifying a master clock signal (frequently called simply "master clock" hereafter) generated by an oscillator, or the like. The amplified clock is used as an operational clock for another integrated circuit formed within a semiconductor chip.

An integrated semiconductor circuit capable of switching between a normal mode and a low-current-consumption mode for each respective circuit block is already known. When a circuit block is not required to operate, in other words, when the block is at standby, it is set to low-current-consumption mode. On the other hand, when it operates, the circuit block switches to normal mode. By setting a circuit block to low-current-consumption mode when it is not operating, it is possible to restrict the power consumption of the circuit block.

In an integrated circuit of this kind, a master clock input circuit is provided for each circuit block. Thereby, an operational clock is supplied from a corresponding master clock input circuit to a circuit block that is set to normal mode. On the other hand, an operational clock is not supplied from a corresponding master clock input circuit to a circuit block that is set to low-current-consumption mode. Thereby, it is possible to restrict the power consumption of the master clock input circuit.

In a general integrated circuit, respective master clock circuits are connected to the same oscillator. Therefore, if noise is generated at the input side of any one of the master clock input circuits, then that noise will be superimposed on the master clock output by the oscillator, and hence there is a risk that it may be input to other master clock input circuits. Noise input to a master clock input circuit degrades the waveform of the operational block output by the master clock circuit during normal mode. This degradation may be a cause of malfunction of the circuit block. Input-side noise is liable to occur when switching between normal mode and low-current-consumption mode.

SUMMARY OF THE INVENTION

It is an object of the present invention to provide a master clock input circuit wherein noise is not liable to occur when switching between normal mode and low-current-consumption mode.

(1) The master clock input circuit relating to the first aspect of the present invention comprises: an amplification gate circuit for amplifying and outputting a master clock when a mode signal is at an active level, and fixing the output value thereof when the mode signal is at a non-active level; a transmission gate circuit for supplying the output clock of the amplification gate circuit to a master clock input terminal of the amplification gate circuit, when the mode signal is at an active level, and setting the output to a high impedance when the mode signal is at a non-active level; and an impedance control circuit, provided between the output terminal of the transmission gate circuit and the master clock input terminal of the amplification gate circuit, having a resistance that is higher than the on-resistance of the transmission gate circuit.

According to the first aspect of the invention, since an impedance control circuit is provided, it is possible to reduce the on-resistance of the transmission gate circuit, and hence the impedance of the parasitic capacitance can be increased and therefore noise generation can be suppressed. Moreover, since an impedance control circuit of high impedance is provided between the output of the transmission gate circuit and the master clock input terminal.

(2) The master clock control circuit relating to a second aspect of the invention comprises: an amplification gate circuit for amplifying and outputting a master clock when a mode signal is at an active level and setting the output to high impedance when the mode signal is at a non-active level; an impedance control circuit, provided between the output terminal of the amplification gate circuit and the input terminal of the amplification gate circuit, having a resistance that is higher than the on-resistance of the amplification gate circuit; and an output gate circuit for outputting a signal corresponding to the output clock of the amplification gate circuit when the mode signal is at an active level, and fixing the output value when the mode signal is at a non-active level.

According to the second aspect of the invention, since an impedance control circuit of high impedance is provided between the output of the transmission gate circuit and the master clock input terminal, it is possible to suppress noise generation.

(3) The master clock input circuit relating to a third aspect of the invention comprises: an amplification gate circuit for amplifying and outputting a master clock when the mode signal is at an active level, and fixing the output value when the mode signal is at a non-active level; a transmission gate circuit for supplying the output clock of the amplification gate circuit to a master clock input terminal of the amplification gate circuit when the mode signal is at an active level, and setting the output to high impedance when the mode signal is at non-active level; and a frequency control circuit for reducing the switching frequency when the transmission gate circuit is switched between an active and non-active state.

According to the third aspect of the invention, since a frequency control circuit is provided, it is possible to reduce the frequency when the transmission gate circuit switches between an active and non-active state, and therefore noise generation can be suppressed.

(4) The master clock input circuit relating to a fourth aspect of the invention comprises: an amplification gate circuit for amplifying and outputting a master clock when a mode signal is at an active level, and fixing the output value when the mode signal is at a non-active level; a transmission gate circuit having a first transistor of a first conductivity type and a second transistor of a second conductivity type, provided between the output terminal and the master clock input terminal of the amplification gate circuit; and a timing control circuit for aligning the change timing of the mode signal supplied to the control terminal of the first transistor and the inverted signal of the mode signal supplied to the control terminal of the second transistor.

According to the fourth aspect of the invention, since a timing control circuit is provided, it is possible to cause the first transistor and second transistor to switch on and off simultaneously, and therefore, the noise can be cancelled out.

BRIEF DESCRIPTION OF THE DRAWINGS

Further objects and advantages of the present invention are now described with reference to the accompanying drawings, wherein.

DESCRIPTION OF THE PREFERRED EMBODIMENTS

Figure 1:
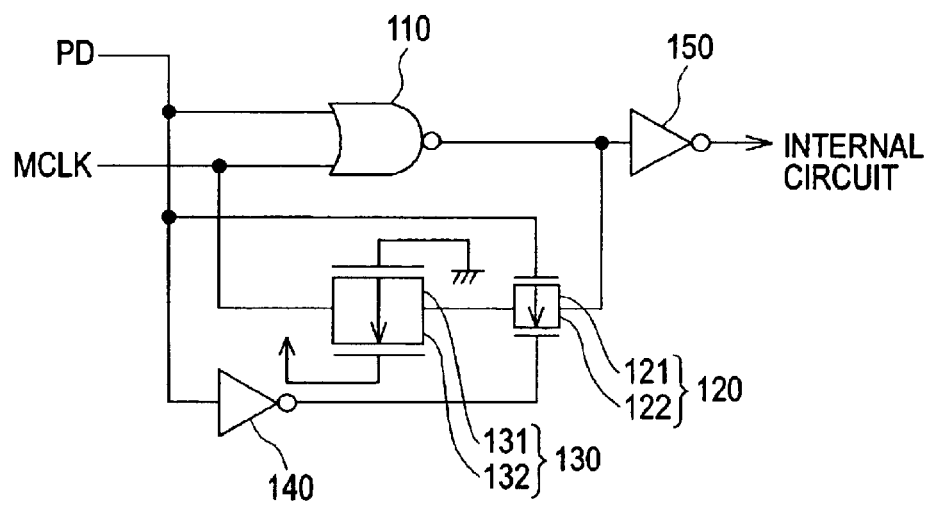
FIG. 1 is a circuit diagram showing a master clock input circuit relating to a first embodiment.

Below, embodiments of the present invention are described with reference to the drawings. In the drawings, the size, shape and respective positions of the various constituent elements are depicted in an approximate fashion for the purpose of understanding the present invention, and furthermore, the numerical conditions described below are given simply as examples.

Related Art

Figure 11:
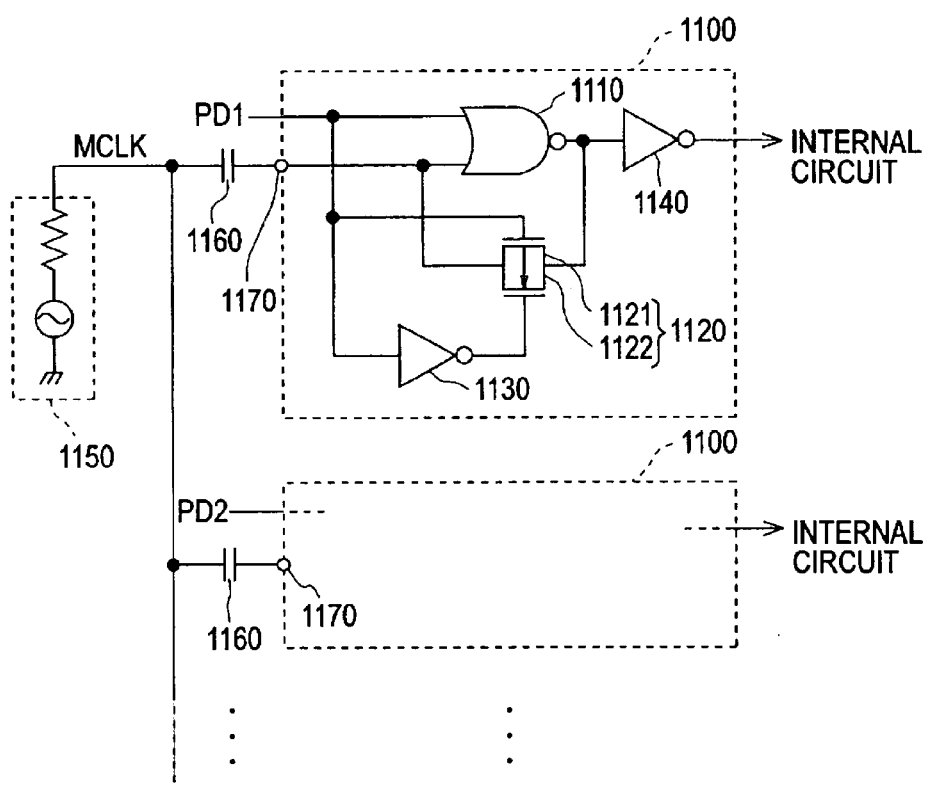
FIG. 11 and FIG. 12 are circuit diagrams showing a master clock input circuit for comparison to the present invention.

FIG. 11 is a circuit diagram showing a compositional example of a master clock input circuit which forms the basis of the present invention. The master clock input circuit 1000 in FIG. 11 is not included in the present invention, and does not represent prior art.

As shown in FIG. 11, an oscillator module 1150 is connected, via coupling condensers 1160, 1160, . . . (for example, 0.01 μF) and clock input terminals 1170, 1170, . . . , to a plurality of master clock input circuits 1100, 1100, . . . .

In the respective master clock input circuits 1100, a NOR gate 1110 inputs a low-current-consumption mode signal PD (either PD1, PD2, or . . . ) from one of the input terminals. Furthermore, the NOR gate 1110 inputs a master clock MCLK generated by the oscillator module 1150, from another input terminal. The output terminal of the NOR gate 1110 and the master clock input terminal of it are connected via a transmission gate 1120. The transmission gate 1120 comprises a pMOS transistor 1121 and an nMOS transistor 1122. The gate of the pMOS transistor 1121 inputs a low-current-consumption mode signal PD. The gate of the nMOS transistor 1122, on the other hand, inputs the inversed value of the low-current-consumption mode signal PD, from the NOT gate 1130. The output of the NOR gate 1110 is supplied via the NOT gate 1140 to an internal circuit.

In normal mode, the low-current-consumption signal PD is set to low level. Therefore, the NOR gate 1110 outputs the inversed value of the master clock MCLK. Moreover, since the low-current-consumption mode signal PD is set to low level, the MOS transistors 1121, 1122 are turned on. Consequently, the output of the NOR gate 1110 passes through the transmission gate 1120 and is superimposed on the master clock MCLK. This superimposition adds a DC component to the original master clock MCLK. Therefore, the master clock MCLK after superimposition is amplified by the NOR gate 1110. The amplified master clock MCLK is then inverted by the NOT gate 1140 and supplied to the internal circuit.

On the other hand, in low-current-consumption mode, the low-current-consumption mode signal PD is set to high level. Therefore, the output of the NOR gate 1110 is fixed to low level. Consequently, the output of the NOT gate 1140 is fixed to high level. Furthermore, if the low-current-consumption mode signal PD is at high level, then the pMOS transistor 1121 and the nMOS transistor 1122 are turned off. This means that the output of the transmission gate 1120 will have high impedance. Accordingly, the output of the NOR gate 1110 is not superimposed on the master clock MCLK.

In a master clock input circuit 1100 such as that illustrated in FIG. 11, in order that the gain and input impedance of the NOR gate 1110 assume suitable values, the on-resistance of the MOS transistors 1121, 1122 is set to a sufficiently high value (for example, approximately 1 MΩ). In order to set a high on-resistance, for example, the gate length of the MOS transistors 1121, 1122 must be set to a high value.

However, in a master clock input circuit such as that illustrated in FIG. 11, a drawback arises in that noise is generated whenever the logic value of the low-current-consumption mode signal PD is switched.

Figure 12:
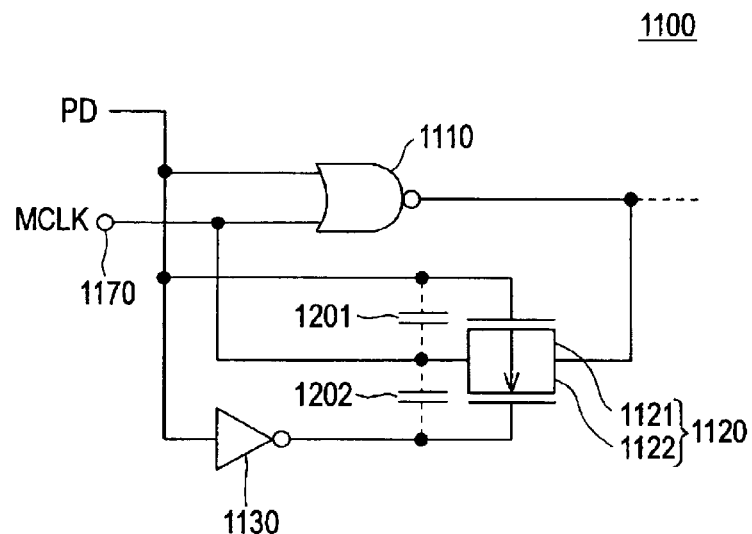

Parasitic capacitances 1201, 1202 are generated between the gate and drain of the MOS transistors 1121, 1122, as illustrated in FIG. 12. Therefore, if the low-current-consumption mode signal PD changes from low level to high level (see FIG. 13(A)), then the electric potential of the clock input terminal 1170 will be drawn up instantaneously in the positive direction (see FIG. 13(C)). Thereupon, when the output potential of the NOT gate 1130 changes from high level to low level (see FIG. 13(B)), the electric potential of the clock input terminal 1170 is pulled down instantaneously in the negative direction (see FIG. 13(C)).

The impedance Z of the parasitic capacitances 1201, 1202 to the clock input terminal 1170 are given respectively in equation (1). Here, f is the frequency of the voltage change applied to the gates of the MOS transistors 1121, 1122, in other words, the frequency when the low-current-consumption mode signal PD changes. Moreover, C is the capacitance value of the parasitic capacitances 1201, 1202.

$$Z = 1/(2\pi f C) \tag{1}$$

As equation (1) reveals, the impedance declines as the frequency f and the capacitance C increase, and therefore, the noise generated increases. As described above, it is desirable that the MOS transistors 1121, 1122 have a sufficiently large gate length. However, the longer the gates of the MOS transistors 1121, 1122, the greater the capacitance value of the parasitic capacitances 1201, 1202, and hence the greater the generated noise.

In this way, the generated noise passes through the coupling capacitor 1160, becomes superimposed on the master clock MCLK, and is supplied to the other master clock input circuit 1100 (see FIG. 11). Consequently, this noise is a cause of malfunctioning in the other master clock input circuit 1100.

First Embodiment

Below, an embodiment of a master clock input circuit relating to a first aspect of the present invention is described with reference to FIG. 1.

FIG. 1 is a circuit diagram of a master clock input circuit relating to this embodiment.

As illustrated in FIG. 1, this master clock input circuit 100 comprises a NOR gate 110, transmission gate 120, impedance control gate 130, and NOT gates 140, 150. Similarly to the comparative example (see FIG. 11), a plurality of master clock input circuits are connected via coupling capacitors (not illustrated in FIG. 1) to an oscillator module (not illustrated in FIG. 1).

As shown in FIG. 1, a NOR gate 110 inputs the low-current-consumption mode signal PD via one input terminal, and inputs a master clock MCLK via the other input terminal. This master clock MCLK is input from an oscillator module (not illustrated in FIG. 1), via a coupling capacitor and clock input terminal (neither of which is illustrated in FIG. 1), similarly to the master clock input circuit in FIG. 11.

The transmission gate 120 comprises a pMOS transistor 121 and nMOS transistor 122. The gate of the pMOS transistor 121 inputs the low-current-consumption mode signal PD. The gate of the nMOS transistor 122, on the other hand, inputs the low-current-consumption mode signal PD via the NOT gate 140. Furthermore, the sources of these MOS transistors 121, 122 are commonly connected to the output terminal of the NOR gate 110.

The impedance control gate 130 comprises a pMOS transistor 131 and nMOS transistor 132. The gate of the pMOS transistor 131 is connected to a ground line. The gate of the nMOS transistor 132, on the other hand, is connected to a power supply line. Accordingly, the MOS transistors 131, 132 are always on. Furthermore, the sources of the MOS transistors 131, 132 are commonly connected to the drains of MOS transistors 121, 122. Moreover, the drains of MOS transistors 131, 132 are commonly connected to the master clock input terminal of the NOR gate 110.

The NOT gate 150 inputs the output signal from the NOR gate 110, inverts it and supplies the inverted signal to an internal circuit (not illustrated).

In the master clock input circuit 100 shown in FIG. 1, the MOS transistors 121, 122 used in the transmission gate 120 have sufficiently low on-resistance. Therefore, the gate length of the MOS transistors 121, 122 is made sufficiently small. On the other hand, the MOS transistors 131, 132 used in the impedance control gate 130 have sufficiently large on-resistance (for example, 1MΩ). Therefore, the gate length of the MOS transistors 131, 132 is made sufficiently large.

Next, the operation of the master clock input circuit 100 is described.

In normal mode, the low-current-consumption mode signal PD is set to low level. Therefore, the output of the NOR gate 110 changes in accordance with the signal level of the master clock MCLK. In other words, the NOR gate inverts and outputs the master clock MCLK. Moreover, since the low-current-consumption mode signal PD is set to low level, the MOS transistors 121, 122 are switched on. In addition, the MOS transistors 131, 132 are always on, as described previously. Accordingly, the output of the NOR gate 110 passes through the transmission gate 120 and the impedance control gate 130, and is superimposed on the master clock MCLK. The master clock MCLK superimposed with this signal is then inverted and amplified by the NOR gate 110. In this way, the master clock MCLK is amplified to a signal level corresponding to the gain of the NOR gate 110. The amplified master clock MCLK is inverted by the NOT gate 150 and supplied to the internal circuit. As described above, in this embodiment, the impedance control gate 130 is constituted by MOS transistors 131, 132 having sufficiently high on-resistance. Therefore, suitable gain and input impedance can be obtained at the NOR gate 110, regardless of the low on-resistance of the transmission gate 120.

Next, a case is described wherein the low-current-consumption mode signal PD changes from low level to high level. In this case, the gate potential of the pMOS transistor 121 changes from low level to high level, and the gate potential of the nMOS transistor 122 changes from high level to low level. Therefore, due to the reasons described above, noise is generated (see FIG. 12 and FIG. 13). However, in this embodiment, the gate length of the MOS transistors 121, 122 is sufficiently small, and therefore the capacitance value of the parasitic capacitances (see FIG. 12) is also sufficiently small. Moreover, an impedance control gate 130 of high impedance is provided between the transmission gate 120, which is the source of the noise, and the master clock input terminal (not illustrated in FIG. 1; see FIG. 12). Therefore, the noise (see FIG. 13) generated when the low-current-consumption mode signal PD changes from low level to high level is sufficiently small. Consequently, it is possible to switch the master clock input circuit 100 to low-current-consumption mode, without causing adverse effects on the other master clock input circuits (not illustrated). This applies similarly in cases where the low-current-consumption mode signal PD has changed from high level to low level.

In the low-current-consumption mode, since the low-current-consumption mode signal PD is at high level, the output of the NOR gate 110 is fixed to low level. Therefore, the output of the NOT gate 150 is fixed to high level. Further, when the low-current-consumption mode signal PD is at high level, the pMOS transistor 121 and nMOS transistor 122 are turned off. Therefore, the output of the transmission gate 120 has high impedance. Consequently, the output of the NOR gate 110 is not superimposed on the master clock MCLK.

Next, simulation results of a circuit using a master clock input circuit 100 are described.

Figure 2:
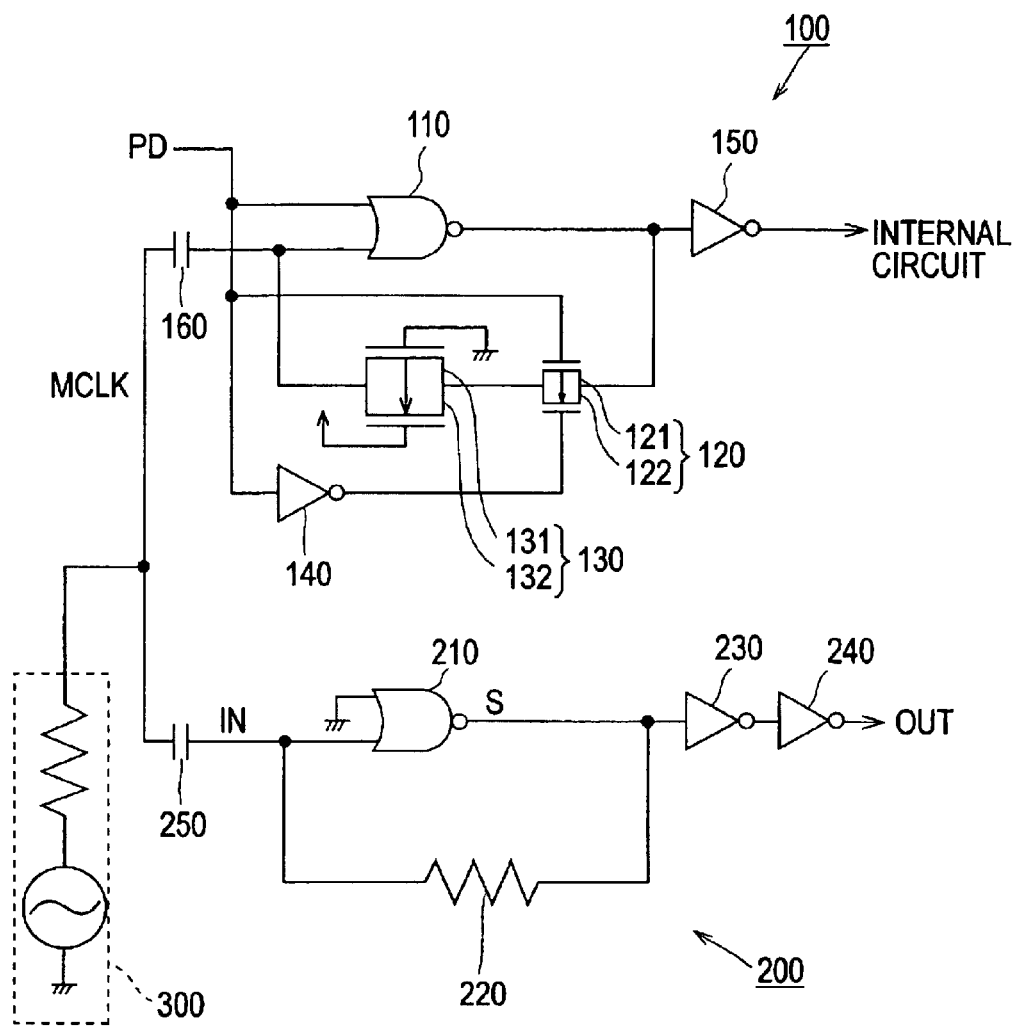
FIG. 2 is a circuit diagram showing a simulation circuit relating to a first embodiment.

FIG. 2 is a circuit diagram showing the composition of a circuit being used for this simulation. In FIG. 2, constituent elements labelled similarly to FIG. 1 respectively indicate the same elements as FIG. 1. As shown in FIG. 2, an oscillator module 300 supplies a master clock MCLK to the master clock input circuits 100, 200, via coupling capacitors 160, 250 (taken to be of 0.01 μF here). The oscillator module 300 is constituted by a 40 MHz quartz oscillator and a 500 Ω resistor element. The master clock input circuit 100 is the master clock input circuit of the present embodiment, as illustrated in FIG. 1. On the other hand, as illustrated in FIG. 2, the master clock input circuit 200 comprises resistance element 220 (taken to be of 500 Ω here), instead of gates 120, 130, and two NOT gates 230, 240 are provided at the output stage thereof. In circuit 200, the input terminal used to input the low-current-consumption mode signal PD from the NOR gate 210 is earthed. Thereby, a circuit is obtained that is virtually equivalent to the master clock input circuit when the low-current-consumption mode signal PD is at low level. For the purpose of comparison, a simulation was also carried out using the master clock input circuit 1100 (see FIG. 11), instead of the master clock input circuit 100.

Figure 3:
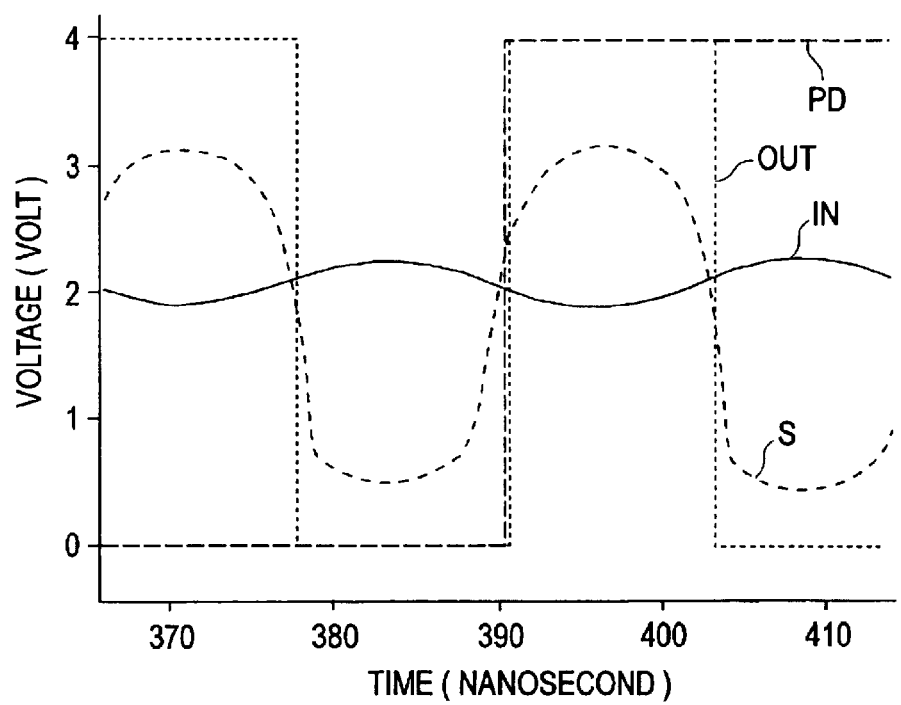
FIG. 3 is waveform diagram showing simulation results for the circuit illustrated in FIG. 2.
Figure 4:
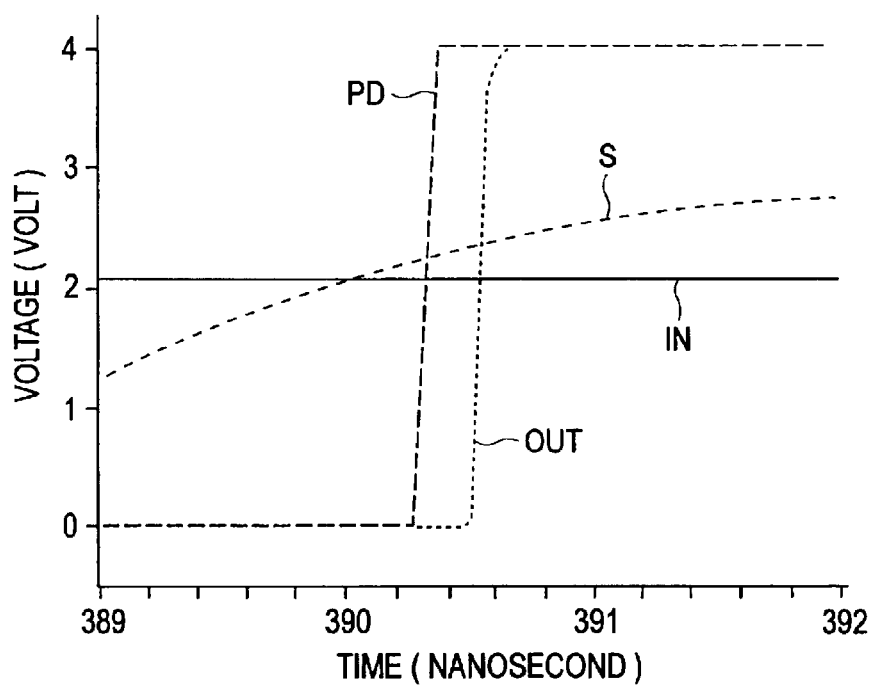
FIG. 4 is a partial enlarged view of the waveform diagram shown in FIG. 3.
Figure 5:
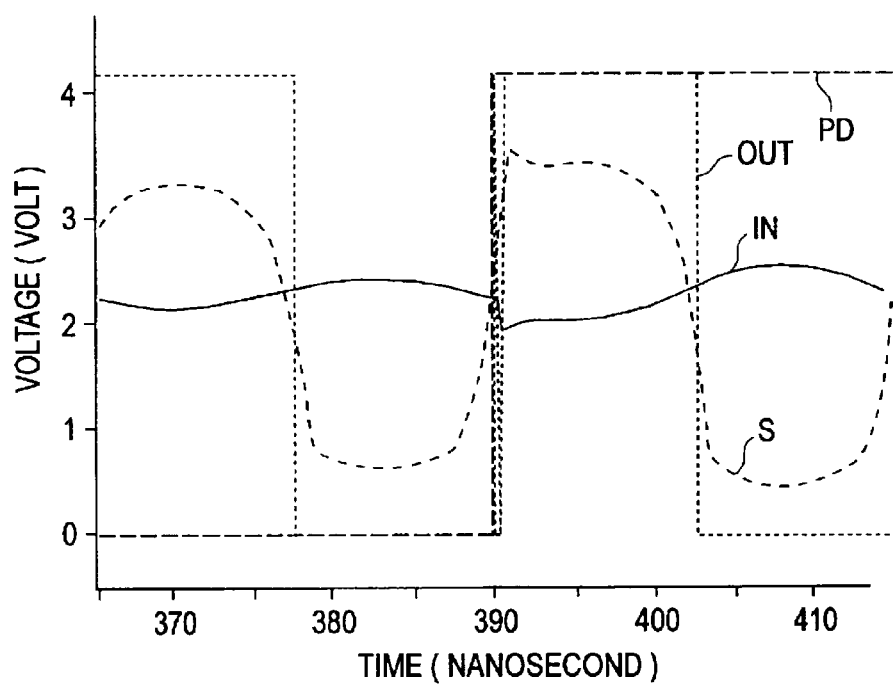
FIG. 5 is a waveform diagram showing simulation results for a circuit for comparison to FIG. 2.
Figure 6:
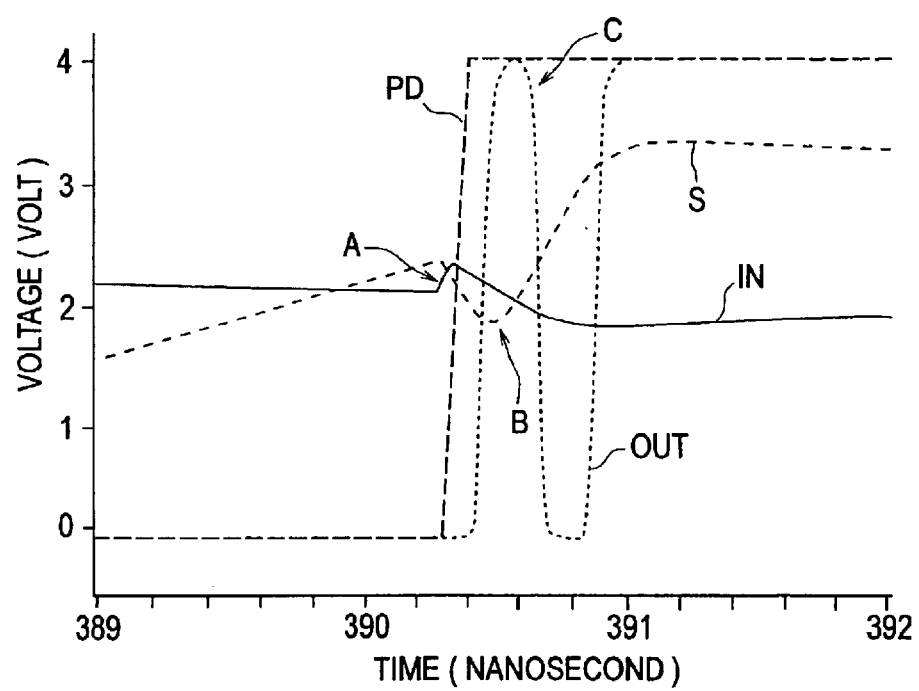
FIG. 6 is a partial enlarged view of the waveform diagram illustrated in FIG. 5.

FIG. 3 shows the simulation results for the circuit illustrated in FIG. 2, and FIG. 4 is a partial enlarged view of FIG. 3. Moreover, FIG. 5 shows the simulation results for the comparative circuit, and FIG. 6 is a partial enlarged view of FIG. 5. In FIG. 3 to FIG. 6, "PD" is a low-current-consumption mode signal supplied to the master clock input circuit 100 (or 1100), "IN" is the master clock MCLK input to the NOR gate 210, "S" is the output of the NOR gate 210, and "OUT" is the output of the NOT gate 240.

As shown in FIG. 5 and FIG. 6, in the comparative circuit, if noise in the positive direction (see FIG. 13(C)) is generated when the low-current-consumption mode signal PD supplied to the master clock input circuit changes from low level to high level, then the signal IN in circuit 200 makes a temporary sharp rise (see "A" of FIG. 6A). Therefore, the output S of the NOR gate 210 makes a temporary sharp fall (see "B" of FIG. 6). Consequently, an amplified noise is output from the output OUT of the NOT gate 240 (see "C" of FIG. 6). This noise may be a cause of malfunction in the circuits downstream from circuit 200.

By contrast, in the circuit in FIG. 2, as illustrated in FIG. 3 and FIG. 4, no noise is generated when the low-current-consumption mode signal PD changes from low level to high level. This means that no noise is superimposed onto the input signal IN at the NOR gate 210, and hence no noise is output from the NOT gate 240. Consequently, there is no risk of malfunction in the circuits downstream from circuit 200.

In this way, according to the present embodiment, it is possible to suppress generation of noise when switching mode, without impairing the amplification characteristics of the master clock input circuit 100.

Second Embodiment

Figure 7:
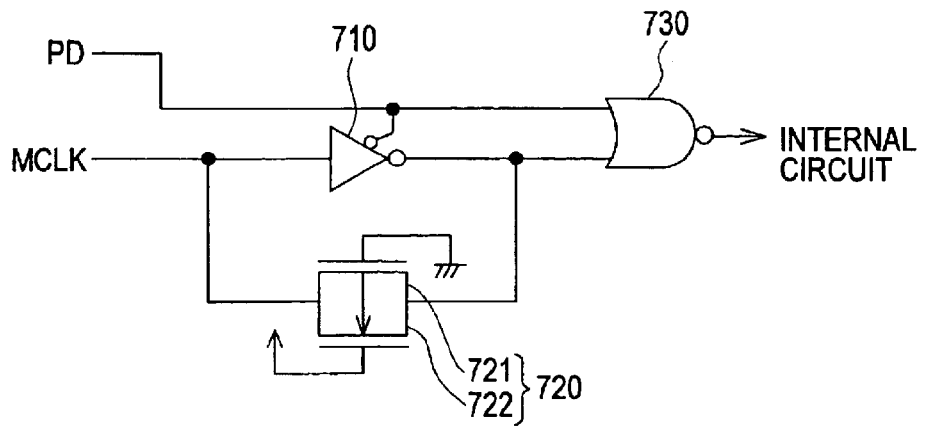
FIG. 7 is a circuit diagram showing a master clock input circuit relating to a second embodiment.

Next, an embodiment of the master clock input circuit relating to a second aspect of the present invention is described, with reference to FIG. 7.

FIG. 7 is a circuit diagram of a master clock input circuit relating to this embodiment.

As shown in FIG. 7, the master clock input circuit 700 relating to this embodiment comprises a clocked inverter 710, an impedance control gate 720, and a NOR gate 730. Similarly to the comparative example (see FIG. 11), a plurality of master clock input circuits are connected via coupling capacitors (not illustrated in FIG. 7), to an oscillator module (not illustrated in FIG. 7).

The clocked inverter 710 inputs a master clock MCLK via an input terminal, and inputs a low-current-consumption mode signal PD via a control terminal. When the low-current-consumption mode signal PD is at low level, the clocked inverter 710 inverts and outputs the master clock MCLK. On the other hand, when the low-current-consumption mode signal PD is at high level, the output of the clocked inverter 710 is set to high impedance.

The impedance control gate 720 comprises a pMOS transistor 721 and nMOS transistor 722. The gate of the PMOS transistor 721 is connected to a ground line. On the other hand, the gate of the nMOS transistor 722 is connected to a power supply line. Thereby, these MOS transistors 721, 722 are permanently switched on. The sources of the MOS transistors 721, 722 are commonly connected to the output terminal of the clocked inverter 710. Moreover, the drains of the MOS transistors 721, 722 are commonly connected to the input terminal of the clocked inverter 710. The transistors used for the MOS transistors 721, 722 of the impedance control gate 720 have sufficiently high on-resistance (for example, 1 MΩ). Therefore, the MOS transistors 721, 722 has sufficiently large gate length.

The NOR gate 730 inputs the low-current-consumption mode signal PD via one input terminal, and inputs the output signal of the clocked inverter 710 from the other input terminal. It then output the inverted logical sum of these signals.

Next, the operation of the master clock input circuit 700 is described.

In normal mode, the low-current-consumption mode signal PD is set to low level. Therefore, the clocked inverter 710 inverts and outputs the master clock MCLK. Furthermore, the MOS transistors 721, 722 are switched on permanently. Consequently, the output of the clocked inverter 710 passes through the impedance control gate 720 and is superimposed on the master clock MCLK. The master clock MCLK superimposed with this signal is then inverted and amplified by the clocked inverter 710. In this way, the master clock MCLK is amplified to a signal level corresponding to the gain of the clocked inverter 710. The amplified master clock MCLK is inverted by the NOR gate 730 and supplied to an internal circuit. As described previously, in this embodiment, the impedance control gate 720 is constituted by MOS transistors 721, 722 having a sufficiently high on-resistance. This means that suitable gain and input impedance can be obtained at the clocked inverter 710.

Next, a case is described wherein the low-current-consumption mode signal PD has changed from low level to high level. In this case, the clocked inverter 710 switches the output to high impedance. Similarly to the transmission gate 1120 (see FIG. 12), the clocked inverter 710 generates noise when it is switched on/off. However, in this embodiment, since an impedance control gate 720 is provided, the effects of this noise can be reduced sufficiently. Therefore, it is possible to switch the master clock input circuit 700 to low-current-consumption mode, without causing adverse effects on the other master clock input circuits (not illustrated). This applies similarly in cases where the low-current-consumption mode signal PD has changed from high level to low level.

In low-current-consumption mode, the low-current-consumption mode signal PD changes to high level and the output of the clocked inverter 710 switches to high impedance. Since the low-current-consumption mode signal PD has a high level, the output of the NOR gate 730 is fixed to low level. Moreover, since the output of the clocked inverter 710 is set to high impedance, the amplified signal is not superimposed on the master clock MCLK.

When a simulation was carried out (see FIG. 2 to FIG. 6) in a similar manner to that of the first embodiment, using the master clock input circuit 700, similar results to those in the first embodiment were obtained.

In this way, according to the present embodiment, it is possible to suppress the generation of noise when switching mode, without impairing the amplification characteristics of the master clock input circuit 700.

Third Embodiment

Next, a further embodiment of a master clock input circuit relating to the second aspect of the present invention is described with reference to FIG. 8.

Figure 8:
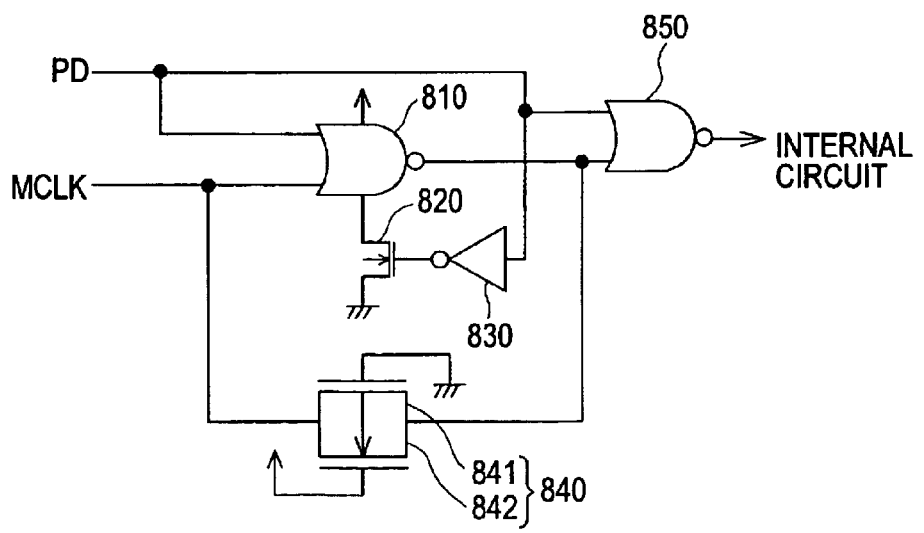
FIG. 8 is a circuit diagram showing a master clock input circuit relating to a third embodiment.

FIG. 8 is a circuit diagram of a master clock input circuit relating to the present embodiment.

As shown in FIG. 8, the master clock input circuit 800 relating to this embodiment comprises NOR gates 810, 850, an nMOS transistor 820, a NOT gate 830, and an impedance control gate 840. Similarly to the comparative example (see FIG. 11), a plurality of master clock input circuits are connected via coupling condensers (not illustrated in FIG. 8) to an oscillator module (not illustrated in FIG. 8).

The NOR gate 810 inputs the master clock MCLK via one input terminal and inputs a low-current-consumption mode signal PD via the other input terminal. Moreover, the power input terminal of the NOR gate 810 is connected to a power supply line, and the ground input terminal thereof is connected to the drain of the nMOS transistor 820.

The source of the nMOS transistor 820 is connected to a ground line. Furthermore, the gate of the nMOS transistor 820 is connected to the output terminal of the NOT gate 830.

The NOT gate 830 inputs the low-current-consumption mode signal PD and output the inverted value thereof.

The impedance control gate 840 comprises a pMOS transistor 841 and nMOS transistor 842. The gate of the pMOS transistor 841 is connected to a ground line. On the other hand, the gate of the nMOS transistor 842 is connected to a power supply line. Thereby, the MOS transistors 841, 842 are permanently turned on. The sources of the MOS transistors 841, 842 are commonly connected to the output terminal of the NOR gate 810. Moreover, the drains of the MOS transistors 841, 842 are commonly connected to the master clock input terminal of the NOR gate 810. The transistors used for the MOS transistors 841, 842 in the impedance control gate 840 have sufficiently high on-resistance (for example, 1 MΩ). Therefore, the MOS transistors 841, 842 have a sufficiently large gate length.

The NOR gate 850 inputs the low-current-consumption mode signal PD via one input terminal and inputs the output signal of the NOR gate 810 via the other input terminal. It then outputs an inverted logical sum of these signals.

Next, the operation of the master clock input circuit 800 will be described.

In normal mode, the low-current-consumption mode signal PD is set to low level. Therefore, the output terminal of the NOR gate 810 conducts with the ground input terminal when the master clock MCLK is at high level, and it conducts with the power input terminal when the master clock MCLK is at low level. Here, since the output of the NOT gate 830 is set to high level when the low-current-consumption mode signal PD is at low level, the nMOS transistor 820 switches on. Therefore, the ground input terminal of the NOR gate 810 conducts with the ground line. This means that the NOR gate 810 is able to invert and output the master clock MCLK. Moreover, the MOS transistors 841, 842 are permanently switched on. Therefore, the output of the NOR gate 810 passes through the impedance control gate 840 and is superimposed on the master clock MCLK. The master clock MCLK superimposed with this signal is inverted and amplified by the NOR gate 810. In this way, the master clock MCLK is amplified to a signal level corresponding to the gain of the NOR gate 810. The amplified master clock MCLK is inverted by the NOR gate 850 and supplied to an internal circuit. As described above, in the present embodiment, the impedance control gate 840 is constituted by MOS transistors 841, 842 with sufficiently high on-resistance. Therefore, suitable gain and input impedance can be obtained at the NOR gate 810.

Next, a case is described wherein the low-current-consumption mode signal PD has changed from low level to high level. If the low-current-consumption mode signal PD is at high level, the output terminal of the NOR gate 810 is fixed to a state where it is disconnected from the power input terminal and conducts with the ground input terminal. However, when the low-current-consumption mode signal PD assumes high level, the output of the NOT gate 830 switches to low level, and therefore, the nMOS transistor 820 switches off. Consequently, the output of the NOR gate 810 has high impedance. Here, the NOR gate 810 generates noise when it switches on/off, similarly to the transmission gate 1120 (see FIG. 12). However, in the present embodiment, since an impedance control gate 840 is provided, the effects of this noise can be reduced sufficiently.

Therefore, it is possible to switch the master clock input circuit 800 to low-current-consumption mode without causing adverse effects on the other master clock input circuits (not illustrated). This applies similarly in cases where the low-current-consumption mode signal PD has changed from high level to low level.

In low-current-consumption mode, the low-current-consumption mode signal PD assumes high level, and the output of the NOR gate 810 changes to high impedance. Since the low-current-consumption mode signal PD is at high level, the output of the NOR gate 850 is fixed to low level. Moreover, since the output of the NOR gate 810 is high impedance, no amplified signal is superimposed on the master clock MCLK.

When a simulation was carried out in a similar manner to that of the first embodiment (see FIG. 2 to FIG. 6), using the master clock input circuit 800, similar results to those in the first embodiment were obtained.

In this way, according to the present embodiment, it is possible to suppress generation of noise during mode switching, without impairing the amplification characteristics of the master clock input circuit 800.

Fourth Embodiment

Figure 9:
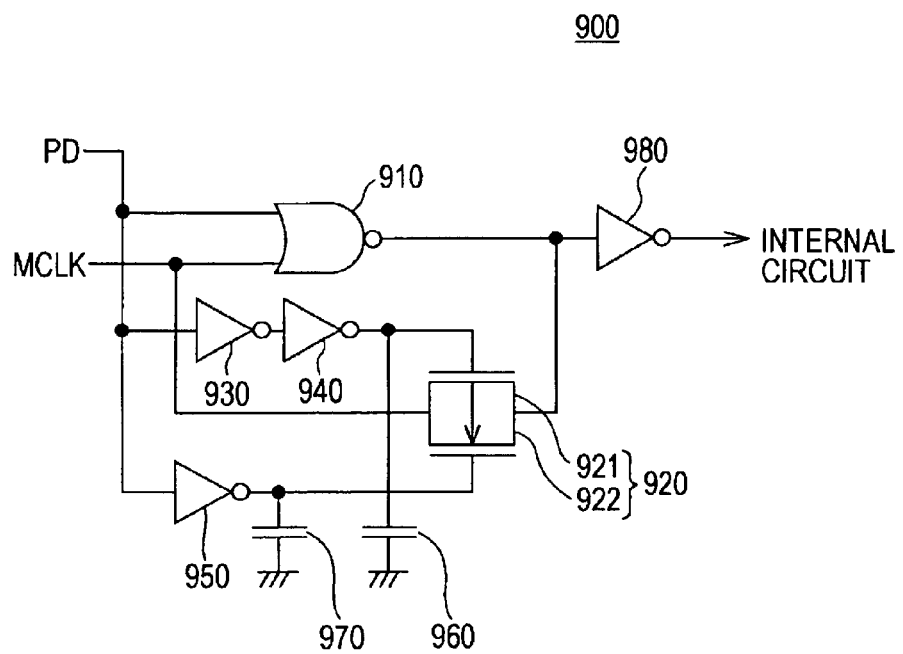
FIG. 9 is a circuit diagram showing a master clock input circuit relating to a fourth embodiment.

Next, an embodiment of a master clock input circuit relating to a third aspect of the present invention is described, with reference to FIG. 9.

FIG. 9 is a circuit diagram of a master clock input circuit relating to this embodiment.

As shown in FIG. 9, the master clock input circuit 900 relating to this embodiment comprises a NOR gate 910, transmission gate 920, NOT gates 930, 940, 950, 980, and capacitors 960, 970. Similarly to the comparative example (see FIG. 11), a plurality of master clock input circuits are connected via coupling capacitors (not illustrated in FIG. 9) to an oscillator module (not illustrated in FIG. 9).

As also shown in FIG. 9, the NOR gate 910 inputs the low-current-consumption mode signal PD from one input terminal and input the master clock MCLK from another input terminal.

The transmission gate 920 comprises a pMOS transistor 921 and nMOS transistor 922. The gate of the pMOS transistor 921 is connected to the output terminal of the NOT gate 940. On the other hand, the gate of the nMOS transistor 922 is connected to the output terminal of the NOT gate 950. Moreover, the sources of these MOS transistors 921, 922 are commonly connected to the output terminal of the NOR gate 910, and the drains thereof are commonly connected to the master clock input terminal of the NOR gate 910. The transistors used for the MOS transistors 921, 922 in the transmission gate 920 have a sufficiently high on-resistance. Therefore, the MOS transistors 921, 922 have a sufficiently large gate length.

The low-current-consumption mode signal PD is input to the input terminal of the NOT gate 930. The output terminal of the NOT gate 930 is connected to the input terminal of the NOT gate 940. The low-current-consumption mode signal PD is input to the input terminal of the NOT gate 950.

One end of the capacitor 960 is connected to the output terminal of the NOT gate 940, and the other end thereof is connected to the ground line. Moreover, one end of the capacitor 970 is connected to the output terminal of the NOT gate 950, and the other end thereof is connected to the ground line.

The NOT gate 980 inputs and inverts the output signal of the NOR gate 910, and supplies it to an internal circuit (not illustrated).

Next, the operation of the master clock input circuit 900 is described.

In normal mode, the low-current-consumption mode signal PD is set to low level. Therefore, the NOR gate 910 inverts and outputs the master clock MCLK. In this case, the gate potential of the PMOS transistor 921 assumes low level and the gate potential of the nMOS transistor 922 assumes high level. Therefore, the MOS transistors 921, 922 are switched on. Consequently, the output of the NOR gate 910 passes through the transmission gate 920 and is superimposed on the master clock MCLK. The master clock MCLK superimposed with this signal is then inverted and amplified by the NOR gate 910. In this way, the master clock MCLK is amplified to a signal level corresponding to the gain of the NOR gate 910. The amplified master clock MCLK is inverted at the NOT gate 980 and supplied to an internal circuit. As described above, in the present embodiment, the transmission gate 920 is constituted by MOS transistors 921, 922 having a sufficiently high on-resistance. Therefore, suitable gain and input impedance can be obtained at the NOR gate 910.

Next, a case is described wherein the low-current-consumption mode signal PD has changed from low level to high level. In this case, the gate potential of the pMOS transistor 921 changes from low level to high level, and the gate potential of the nMOS transistor 922 changes from high level to low level. Here, in the master clock input circuit 900 relating to this embodiment, since the NOT gates 930, 940 and the capacitor 960 are provided, the rise in the gate potential of the pMOS transistor 921 is smoothed. In other words, the frequency f of the voltage change when the gate potential of MOS transistor 921 rises is reduced, by means of the on-resistance of the NOT gates 930, 940 and the capacitance of the capacitor 960. Therefore, since the impedance of the parasitic capacitance (see FIG. 12) is large (see Equation (1)), the generated noise (see FIG. 13) becomes small. Similarly, the frequency f of the voltage change when the gate potential of MOS transistor 922 falls is reduced, by means of the on-resistance of the NOT gate 950 and the capacitance of the capacitor 970. Therefore, since the impedance of the parasitic capacitance (see FIG. 12) is large (see Equation (1)), the generated noise (see FIG. 13) becomes small. In this way, the master clock input circuit 900 is able to switch to low-current-consumption mode without causing adverse effects on the other master clock input circuits (not illustrated). Moreover, the same applies in cases where the low-current-consumption mode signal PD has changed from high level to low level.

In low-current-consumption mode, since the low-current-consumption mode signal PD has a high level, the output of the NOT gate 910 is fixed to low level. Therefore, the output of the NOT gate 980 is fixed to high level. Moreover, when the low-current-consumption mode signal PD is at low level, the pMOS transistor 921 and nMOS transistor 922 are turned off. Therefore, the output of the transmission gate 920 assumes high impedance. Consequently, the output of the NOR gate 910 is not superimposed on the master clock MCLK.

When a simulation (see FIG. 2–FIG. 6) similar to that in the first embodiment was carried out using the master clock input circuit 900, results similar to those in the first embodiment were obtained.

In this way, according to the present embodiment, it is possible to suppress noise generation during mode switching, without impairing the amplification characteristics of the master clock input circuit 900.

Fifth Embodiment

Next, an embodiment of a master clock input circuit relating to a fourth aspect of the present invention is described with reference to FIG. 10.

Figure 10:
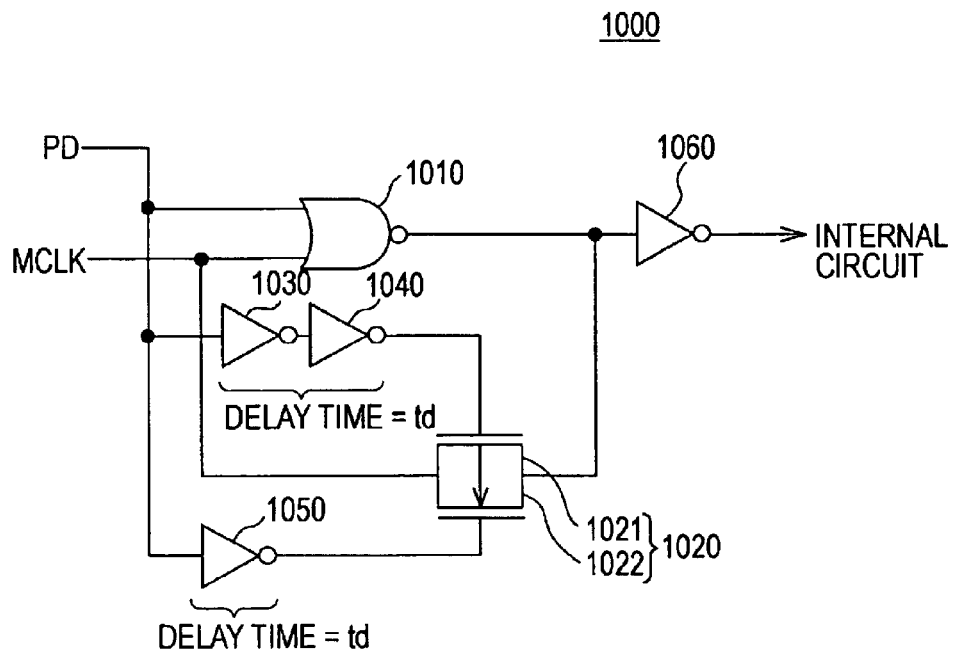
FIG. 10 is a circuit diagram showing a master clock input circuit relating to a fifth embodiment.

FIG. 10 is a circuit diagram of a master clock input circuit relating to this embodiment.

As shown in FIG. 10, the master clock input circuit 1000 relating to this embodiment comprises a NOR gate 1010, transmission gate 1020, and NOT gates 1030, 1040, 1050, 1060. Similarly to the comparative example (see FIG. 11), a plurality of master clock input circuits are connected via coupling capacitors (not illustrated in FIG. 10) to an oscillator module (not illustrated in FIG. 10).

As illustrated in FIG. 10, the NOR gate 1010 inputs the low-current-consumption mode signal PD via one input terminal and inputs the master clock MCLK via the other input terminal.

The transmission gate 1020 comprises a pMOS transistor 1021 and nMOS transistor 1022. The gate of the pMOS transistor 1021 is connected to the output terminal of the NOT gate 1040. On the other hand, the gate of the nMOS transistor 1022 is connected to the output terminal of the NOT gate 1050. The sources of the MOS transistors 1021, 1022 are commonly connected to the output terminal of the NOR gate 1010, and the drains thereof are commonly connected to the master clock input terminal of the NOR gate 1010. The transistors used for the MOS transistors 1021, 1022 of the transmission gate 1020 have sufficiently high on-resistance. Therefore, the MOS transistors 1021, 1022 have a sufficiently large gate length.

The NOT gates 1030, 1040 are connected in series. In other words, the low-current-consumption mode signal PD is input via the input terminal of the NOT gate 1030 and output via the output terminal of the NOT gate 1040. In this embodiment, the delay time of the NOT gates 1030, 1040, in other words, the time required for the low-current-consumption mode signal PD input via the input terminal of the NOT gate 1030 to be output from the output terminal of the NOT gate 1040, is taken as td. On the other hand, the low-current-consumption mode signal PD is input to the input terminal of the NOT gate 1050. In this embodiment, the delay time of the NOT gate 1050 is also taken to be td. In other words, in the present embodiment, the delay time of the serially connected NOT gates 1030, 1040 is set to the same time as the delay time of the NOT gate 1050. Thereby, the timing at which the low-current-consumption mode signal PD reaches the gate of the pMOS transistor 1021 is made to coincide substantially with the timing at which the inverted signal of the mode signal PD reaches the gate of the nMOS transistor 1022.

The NOT gate 1060 inputs and inverts the output signal of the NOR gate 1010 and supplies it to an internal circuit (not illustrated).

Next, the operation of the master clock input circuit 1000 will be described.

In normal mode, the low-current-consumption mode signal PD is set to low level. Therefore, the NOR gate 1010 inverts and outputs the master clock MCLK. In this case, the gate potential of the pMOS transistor 1021 assumes low level and the gate potential of the nMOS transistor 1022 assumes high level. Therefore, the MOS transistors 1021, 1022 switch on. Consequently, the output of the NOR gate 1010 passes through the transmission gate 1020 and is superimposed on the master clock MCLK. The master clock MCLK superimpose with this signal is inverted and amplified by the NOR gate 1010. In this way, the master clock MCLK is amplified to a signal level corresponding to the gain of the NOR gate 1010. The amplified master clock MCLK is inverted by the NOT gate 1060 and supplied to an internal circuit. As described above, in this embodiment, the transmission gate 1020 is constituted by MOS transistors

1021, 1022 having a sufficiently large on-resistance. Therefore, suitable gain and input impedance can be obtained at the NOR gate 1010.

Figure 13:
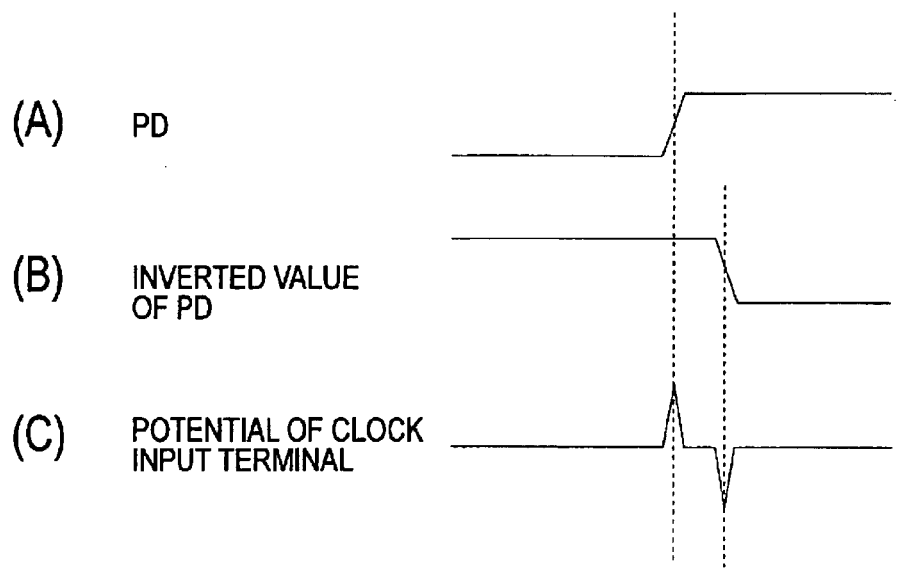
FIG. 13 is a conceptual diagram for describing the operation of the master clock input circuit illustrated in FIG. 11 and FIG. 12.

Next, a case is described wherein the low-current-consumption mode signal PD has changed from low level to high level. In this case, the gate potential of the pMOS transistor 1021 changes from low level to high level, and the gate potential of the nMOS transistor 1022 changes from high level to low level. As described previously, in this embodiment, since the delay time of the NOT gates 1030, 1040 matches the delay time of the NOT gate 1050, the gate potentials of the MOS transistors 1021, 1022 change at the same timing. Consequently, the MOS transistors 1021, 1022 switch off in a substantially simultaneous manner. Therefore, noise caused by the parasitic capacitance between the gate and drain of the pMOS transistor 1021 (parasitic capacitance corresponding to the parasitic capacitance 1201 in FIG. 12) and the noise caused by the parasitic capacitance between the gate and drain of the nMOS transistor 1022 (parasitic capacitance corresponding to the parasitic capacitance 1202 in FIG. 12) are generated simultaneously. As illustrated in FIG. 13, the noise on the pMOS transistor side and the noise on the nMOS transistor side have opposing polarity. Therefore, if these noises are generated simultaneously, then they cancel each other out. Consequently, the master clock input circuit 1000 can switch to low-current-consumption mode without causing adverse effects on the other master clock input circuits (not illustrated). Furthermore, the same applies in cases where the low-current-consumption mode signal PD has changed from high level to low level.

In low-current-consumption mode, since the low-current-consumption mode signal PD is set to high level, the output of the NOR gate 1010 is fixed to low level. Therefore, the output of the NOT gate 1060 is fixed to high level. When the low-current-consumption mode signal PD is at high level, the pMOS transistor 1021 and nMOS transistor 1022 are turned off. Therefore, the output of the transmission gate 1020 assumes high impedance. Consequently, the output of the NOR gate 1010 is not superimposed on the master clock MCLK.

When a simulation similar to that of the first embodiment (FIG. 2–FIG. 6) was carried out using master clock input circuit 1000, results similar to those of the first embodiment were obtained.

In this way, according to the present embodiment, it is possible to suppress generation of noise during mode switching, without impairing the amplification characteristics of the master clock input circuit 1000.

As described in detail above, according to the present invention, it is possible to provide a master clock input circuit wherein the gain and impedance of the amplification gate circuit are set suitably and generation of noise during mode switching is suppressed, in other words, a master clock input circuit having excellent amplification characteristics which does not cause adverse effects on other circuits.

What is claimed is:

1. A master clock input circuit comprising:
    an amplification gate circuit for amplifying and outputting a master clock when a mode signal is at an active level and setting the output to high impedance when said mode signal is at a non-active level;
    an impedance control circuit, provided between the output terminal of said amplification gate circuit and the input terminal of said amplification gate circuit, having a resistance that is higher than the on-resistance of said amplification gate circuit; and
    an output gate circuit for outputting a signal corresponding to the output clock of said amplification gate circuit when said mode signal is at an active level, and fixing the output value when said mode signal is at a non-active level.

2. The master clock input circuit according to claim 1, wherein said amplification gate circuit comprises:
    a logic gate which inputs a mode signal via one input terminal and inputs a master clock via the other input terminal; and
    a switch for connecting said logic gate and a first power supply line or second power supply line when said mode signal is at an active level, and disconnecting said logic gate and said first or second power supply line when said mode signal is at a non-active level.

3. The master clock input circuit according to claim 1, wherein said impedance control circuit comprises:
    a first transistor of a first conductivity type, one end of which is connected to the output terminal of said amplification gate circuit and the other end of which is connected to the input terminal of said amplification gate circuit, having a control terminal connected to a first power supply line; and
    a second transistor of a second conductivity type, one end of which is connected to the output terminal of said amplification gate circuit and the other end of which is connected to the input terminal of said amplification gate circuit, having a control terminal connected to a second power supply line.

4. The master clock input circuit according to claim 1, wherein said output gate circuit comprises a NAND gate, one input terminal of which is connected to the output terminal of said amplification gate circuit, said mode signal being input via the other input terminal thereof.

5. A master clock input circuit comprising:
    an amplification gate circuit for amplifying and outputting a master clock when a mode signal is at an active level, and fixing the output value when said mode signal is at a non-active level;
    a transmission gate circuit for supplying the output clock of said amplification gate circuit to a master clock input terminal of said amplification gate circuit when said mode signal is at the active level, and setting the output to high impedance when said mode signal is at the non-active level; and
    a frequency control circuit which inputs said mode signal from outside, reduces a switching frequency between the active level and the non-active level of said mode signal, and supplies the low frequency mode signal to a control terminal of said transmission gate.

6. The master clock input circuit according to claim 5, wherein said amplification gate circuit comprises a NOR gate.

7. The master clock input circuit according to claim 6, further comprising a NOT gate for inverting the output value of said NOR gate.

8. The master clock input circuit according to claim 5, wherein said transmission gate circuit comprises:
    a first transistor of a first conductivity type, one end of which is connected to the output terminal of said amplification gate circuit and the other end of which is connected to the master clock input terminal of said amplification gate circuit, said mode signal being input via a control terminal thereof; and
    a second transistor of a second conductivity type, one end of which is connected to the output terminal of said amplification gate circuit and the other end of which is connected to the master clock input terminal of said amplification gate circuit, the inverted value of said mode signal being input via a control terminal thereof.

9. The master clock input circuit according to claim 8, wherein said frequency control circuit comprises:
a first NOT gate which inputs said mode signal via an input terminal;
a second NOT gate, the input terminal of which is connected to the output terminal of said first NOT gate and the output terminal of which is connected to the control terminal of said first transistor;
a third NOT gate, the input terminal of which is supplied with said mode signal and the output terminal of which is connected to the control terminal of said second transistor;
a first capacitor, one end of which is connected to the output terminal of said second NOT gate and the other end of which is connected to the first power supply line;
a second capacitor, one end of which is connected to the output terminal of said third NOT gate and the other end of which is connected to said first power supply line.

10. The master clock input circuit according to claim 5, wherein said amplification gate circuit comprises a multi-input logic gate having an inverting function.

11. A master clock input circuit comprising:
an amplification gate circuit for amplifying and outputting a master clock when a mode signal is at an active level, and fixing the output value when said mode signal is at a non-active level;
a transmission gate circuit having a first transistor of a first conductivity type and a second transistor of a second conductivity type, provided between the output terminal and the master clock input terminal of said amplification gate circuit; and
a timing control circuit which inputs said mode signal from outside, generates an inverted signal of said mode signal, aligns delay times of said mode signal and said inverted signal, and supplies said mode signal to the control terminal of said first transistor and said inverted signal to the control terminal of said second transistor.

12. The master clock input circuit according to claim 11, wherein said amplification gate circuit comprises a NOR gate.

13. The master clock input circuit according to claim 12, further comprising a NOT gate for inverting the output value of said NOR gate.

14. The master clock input circuit according to claim 11, wherein said timing control circuit comprises:
a first NOT gate which inputs said mode signal via an input terminal;
a second NOT gate, the input terminal of which is connected to the output terminal of said first NOT gate and the output terminal of which is connected to the control terminal of said first transistor; and
a third NOT gate, the input terminal of which is supplied with said mode signal and the output terminal of which is connected to the control terminal of said second transistor, having a delay time equal to the sum of the delay time of said first NOT gate and the delay time of said second NOT gate.

15. The master clock input circuit according to claim 11, wherein said amplification gate circuit comprises a multi-input logic gate having an inverting function.

16. A master clock input circuit, comprising:
an amplification gate circuit having a first input terminal that receives a mode signal and a second input terminal that receives a master clock signal which is supplied to the master clock input circuit and at least one other master clock input circuit via a common line, the amplification gate circuit additionally having an output terminal;
a transmission gate circuit having transistors that are turned on and off in accordance with the mode signal; and
an impedance control circuit for adjusting an input impedance of the second input terminal of the amplification gate circuit, the impedance control circuit and the transmission gate circuit being connected in series between the output terminal of the amplification gate circuit and the second input terminal of the amplification gate circuit,
wherein said transmission gate circuit includes:
a first transistor of a first conductivity type, the first transistor having a gate electrode which receives the mode signal and another electrode that is connected to the output terminal of the amplification gate circuit, and
a second transistor of a second conductivity type opposite to the first conductive type, the second transistor having a gate electrode that receives an inverted value of the mode signal, another electrode that is connected to the output terminal of the amplification gate circuit, and a further electrode that is connected to a further electrode of the first transistor,
wherein said impedance control circuit includes:
a third transistor of the first conductivity type, the third transistor having a gate electrode that receives a voltage for keeping the third transistor in an on-state, another electrode that is connected to the further electrodes of the first and second transistors, and a further electrode that is connected to the second input terminal of the amplification gate circuit, and
a fourth transistor of the second conductivity type, the fourth transistor having a gate electrode that receives a voltage for keeping the fourth transistor in an on-state, another electrode that is connected to the further electrodes of said first and second transistors, and a further electrode that is connected to the second input terminal of the amplification gate circuit, and
wherein the third and fourth transistors have gate lengths longer than the gate lengths of the first and second transistors respectively.

17. A master clock input circuit, comprising:
a first node for receiving a mode signal;
a second node for receiving a master clock from a common line that also supplies the master clock to at least one other master clock circuit;
a third node;
an amplification gate circuit having a first input terminal that receives the mode signal from the first node, a second input terminal that receives the master clock from the second node, and an output terminal that conveys an amplified master clock to the third node when the mode signal is at an active level, and that conveys a fixed output level to the third node when the mode signal is at a non-active level;
a transmission gate circuit that receives the electric potential of the third node, the transmission gate circuit having an output terminal that outputs the input electric potential when the mode signal is at the active level and that sets the output to a high impedance when the mode signal is at the non-active level, the transmission gate circuit including:

a first transistor having a gate electrode that receives the mode signal, another electrode that is connected to the third node, and a further electrode that provides the output terminal of the transmission gate circuit, and a second transistor having a gate electrode that receives an inverted value of the mode signal, another electrode that is connected to the third node, and a further electrode that is connected to the further electrode of the first transistor; and an impedance control circuit that is connected between the output terminal of the transmission gate circuit and the second node, the impedance control circuit including:

a third transistor having a gate electrode that receives a first voltage for keeping the third transistor in an on-state, another electrode that is connected to the further electrodes of the first and second transistors, and a further electrode that is connected to the second node, and a fourth transistor having a gate electrode that receives a second voltage for keeping the fourth transistor in an on-state, another electrode that is connected to the further electrodes of the first and second transistors, and a further electrode that is connected to the second node, wherein the third and fourth transistors have gate lengths that are longer than the gate lengths of the first and second transistors, respectively.

18. The master clock input circuit according to claim 17, wherein said amplification gate circuit comprises a NOR gate.

19. The master clock input circuit according to claim 18, further comprising a NOT gate which is connected to the third node and inverts the output value of said NOR gate.

20. The master clock input circuit according to claim 17, wherein said amplification gate circuit is a clocked inverter which inputs a mode signal via a control terminal and inputs a master clock via an input terminal.

21. The master clock input circuit according to claim 17, wherein said amplification gate circuit comprises a multi-input logic gate having an inverting function.

22. The master clock input circuit according to claim 17, wherein the first and third transistors are of a first conductivity type, and the second and fourth transistors are of a second conductivity type opposite to the first conductivity type.

* * * * *